United States Patent [19]
Lee et al.

[11] Patent Number: 4,951,225
[45] Date of Patent: Aug. 21, 1990

[54] UPDATING PATTERN-MATCHING NETWORKS

[75] Inventors: Ho S. Lee, Mount Kisco; Marshall I. Schor, Katonah, both of N.Y.

[73] Assignee: International Business Machines Corp., Armonk, N.Y.

[21] Appl. No.: 272,135

[22] Filed: Nov. 14, 1988

[51] Int. Cl.$^5$ .............................................. G06F 15/18
[52] U.S. Cl. ..................................................... 364/513
[58] Field of Search .................... 364/513, 200, 274.1, 364/275; 382/14, 15

[56] References Cited

U.S. PATENT DOCUMENTS

| | | | |
|---|---|---|---|
| 4,761,746 | 8/1988 | Tano et al. | 364/513 |
| 4,837,735 | 6/1989 | Allen, Jr. et al. | 364/513 |
| 4,849,905 | 7/1989 | Loeb et al. | 364/513 |
| 4,882,691 | 11/1989 | Schor | 364/513 |
| 4,890,240 | 12/1989 | Loeb et al. | 364/513 |

*Primary Examiner*—Allen MacDonald
*Attorney, Agent, or Firm*—Herb Somermeyer; R. Bruce Brodie

[57] ABSTRACT

A pattern-matching system, such as of the RETE type, is updated. The updating operation is generalize to operate with correct match resuslts for generalized RETE networks (ones where join nodes may have either predecessor be another join node), and for arbitrary partial update state, characterized by stop nodes designating how far update operations have progressed for particular update tokens (designated suspended tokens) at any particular time. The updating operation consists of the following steps: First, all tokens only partially updated through the network are shadowed, in that the partial result memories associated with the stop nodes are put into the state that exists or existed before the suspended tokens arrive at the stop nodes. Then for each suspended token, it is pushed to resume nodes connected as RHS (or LHS) inputs in a descending order of resume nodes. The descending order is determined among sets of resume nodes where one node is reachable from the other, either in an upwards or downwards direction. Following one token's push to RHS (or LHS) connected resume nodes, that token is unshadowed in the stop node's associated result memory, and that token is then pushed to resume nodes connected as LHS (or RHS) inputs, in an ascending order of resume nodes. Tokens are pushed from alpha top nodes when the stop node is in the alpha portion of the RETE network, to the suspended portion of the successor nodes of the alpha top node.

19 Claims, 3 Drawing Sheets

UPDATING PATTERN-MATCHING NETWORKS

FIELD OF THE INVENTION

The present invention relates to pattern-matching networks, such as a RETE network, which are used in so-called artificial intelligence programmed systems.

BACKGROUND OF THE INVENTION

So-called artificial intelligence or pattern-matching programming has been developing and used over the last several years, such as the RETE taught by Forgy. The RETE network is one of several approaches to pattern-matching using set(s) of matching rules. These programs are well known; see the description by Charles L. Forgy in "RETE: A Fast Algorithm for the Many Pattern/Many Object Pattern Match Problem", ARTIFICIAL INTELLIGENCE, Volume 19, 1982, pp 17-37. Another example of the public knowledge in this area is found in an article by Marshall I. Schor et al. in "Advances in RETE Pattern Matching", PROCEEDINGS of 1986 AMERICAN ASSOCIATION for ARTIFICIAL INTELLIGENCE CONFERENCE, pp 226-232, 1986. The well known information about RETE algorithms and artificial intelligence programming is not repeated herein except as needed for one of ordinary skill in this art to understand the present invention.

As set forth by Forgy, the RETE algorithm exhibits certain performance advantages when large numbers of data pattern matches have to be performed. In a RETE, a rule defines one logic path of pattern matches through the network. A problem of accuracy (i.e. the RETE may generate unexpected results) can occur in certain cases. These unexpected results are such things as duplicated pattern matches (multiple rule "firings" where only one rule firing is a correct RETE response) and missing a true pattern match. Such unintended results are incorrect RETE results. It is desired to avoid unexpected pattern match results for a variety of network environmental conditions, such as pushing data changes from multiple memory nodes (this may occur when implementing dynamic rule addition to an existing RETE where it is desired to initialize the new rule with existing data, or implementing a variety of on-demand pattern matching extensions to the basic RETE algorithm), and pushing data changes through RETE structures which have been generalized to include arbitrary grouping of join structures.

As is well known, such pattern-matching programming executes with a plurality of data structures. A working memory element (WME) is an input data structure. Any new, modified or removed WME results in a "token" (or delta), which is a data structure composed of one or more WMEs together with an associated data operation. Since the current informational content of the RETE does not reflect the WME addition, change or deletion, the RETE needs to be updated by propagating the token through the network such that it reflects the current informational state of the inputs. Each time a token is pushed (processed) through a RETE and is matched with patterns in a RETE constitutes a pattern match operation.

The RETE, as taught by Forgy, consists of alpha and beta portions. When a change token is processed through the RETE, the alpha portion is first traversed after the informational content of a new or changed WME or the informational change resulting from a deleted WME is made available to a "root node". A root node is a data area of the network that is the entry point to the RETE. A set of "top" nodes are connected to the root node. These in turn are connected to successor nodes, finally reaching a plurality of termination or bottom nodes, termed production or match nodes. Each of the node data structures may include match tests for incoming tokens. As known in the art, some of the nodes have memory items to be scanned in a table. These may be implemented as separate nodes, termed "memory nodes", or the tables may be directly associated with nodes representing match operations. The associated memory table for a particular node will be referred to as that node's "result memory". Result memory tables are associated with beta nodes and alpha distribution nodes which will be described later.

The tables for memory items contain values (numeric, text, etc.) which represent partial matching results up to that point in the network. These values may be used in subsequent matching operations as one of the inputs to a "join" node. It is to be understood that table accesses follow usual programming procedures and that the matching operations are usual programming effected comparisons.

The alpha portion of a RETE has no result memories, i.e. tables wherein partial pattern matching results are stored; in contrast the beta portion includes such memory tables. In between the alpha and beta portions are nodes called alpha distribution nodes, all of which have result memories which store the partial pattern matching results generated in the alpha portion. From these alpha distribution nodes, the tokens are pushed into the beta portion.

Some of the RETE nodes have one input while other RETE nodes have two inputs. All alpha nodes (as do later described production nodes or match nodes) have one input as do the alpha distribution nodes. Such one inputs are herein referred to as an "RHS input" or simply "input". In contrast, most beta nodes, except production nodes, match nodes, and other special purpose nodes, have two inputs: one input is a left hand side (LHS) input and the other input is a right hand side (RHS) input. Such two input nodes are called "join nodes"; token pairs (consisting of a token as an input from each side of the node (LHS and RHS) are subjected to join tests of such join node (which may be no test at all). If a join test is successful (or no test), it is said the token inputs are joined together, resulting in new amalgamated tokens which are used to update the associated result memory table of the join node.

Execution of a RETE algorithm starts with a change token, representing the addition, modification, or deletion of a WME, and scans a plurality of alpha nodes. Each alpha node tests various aspects of the WME as represented by the token, and passes or blocks (does not pass) the token on to various successors nodes (hereafter successors) of the alpha node. A successor node is a node that receives an input from the current node; a predecessor node is a node which supplies an input to the current node.

This updating continues, as is well known in the prior art, until the bottom of the alpha portion is reached. At this point, the first result memory at the logical bottom of the alpha portion (the alpha distribution node) receives the token, and may update its memory in accordance with the particular WME and operation (add, modify, or delete). Following these pattern matching operations, the beta portion of the RETE continues the RETE operations. For each token arriving at one input of a prototypical beta join node, such node specifies pattern matching functions between the token contents at the one input (either LHS or RHS) and a set of partially matched tokens contained in the result memory found at the predecessor node which supplies inputs to the input of such join node at the opposite input to the one input. The partial matching results and the token contents are compared using tests defined in such join node.

In OPS5, the possible structure of the RETE network is strictly limited to so-called "linear and left associative" updating. Consequently, pattern matching operations in OPS5 work only in such limited RETE structures. That is, the resultant output from join nodes goes only to the LHS input of successor join nodes. The term "predecessor" and "successor" nodes defines the logical relationship of the nodes. A predecessor node to a given node means that the output of the predecessor node becomes an input to the given node. A successor node to the given node receives its output as an input; for a join node, this input may be received at either the LHS or RHS input. In the "linear and left associative" RETE structure, join node outputs which are connected to successor join nodes are connected to the LHS input of successor join nodes, only. The RHS input to all join nodes is from alpha distribution nodes.

As set forth by Schor et al., supra, it is desirable to generalize the structure of RETE to allow any arbitrary match patterns. In a Schor et al generalized RETE, tokens from predecessor join nodes as well as alpha distribution nodes also can be supplied to the RHS input of a join node. Thus, a join node can receive inputs at LHS and RHS inputs from two different or identical predecessor join nodes. Further, the RETE structure enabled by the present invention can be non-linear, e.g. binary, and have any diverse associative characteristics.

A node is called "self-joined" whenever one of its outputs is joined with an output of itself or its immediate or non-immediate successors. In OPS5 the only possible node type of the selfjoined nodes is the alpha distribution node, while in the generalized RETE there are no such restrictions.

In OPS5, when a token is pushed from a node having an associated memory, such as a beta join node, the RETE algorithm scans successor nodes in a certain order to which output tokens are to be pushed. For the successors which are connected as LHS inputs, the order of scanning is a later defined ascending order (scan starting from a logically remote node to nearer nodes). This ascending scan is a known OPS5 operation.

In generalized RETE structure, unlike in OPS5, tokens may be generally supplied to either of the two nodal inputs, LHS or RHS, from nodes having result memories, including beta join nodes. It has been found that applying the scanning algorithm used in OPS5 may produce unexpected results (errors) under environmental conditions referred to above. It is desired to avoid such errors and extend the successful and correct operations of matching networks to include variable environmental conditions. SUMMARY OF THE INVENTION The present invention provides for accurate match network updating irrespective of diverse environmental changes or actions of a pattern-match network; this provision enables generalization of pattern-match network structure and operation. In this invention, a RETE network is to be updated by sending tokens from a set of so-called "stop nodes". In accordance with the invention, not all portions of the RETE have to be updated by each addition, change or deletion of input information from a working memory. Stop nodes are designated in the network to stop the updating from reaching predetermined ones of the nodes; such stop nodes are updated. All nodes which are not updated are members of a second portion of the network termed "suspended" portion signifying that such predetermined nodes have not been updated to the latest network update. One or more suspended portions may exist in the second portion and each suspended portion has one or more stop nodes logically attached thereto. Each suspended portion is connected to the rest of the RETE for selectively receiving tokens through the stop nodes. Resume nodes heading the suspended portion are immediate successors to the respective stop nodes, each stop node may have one or more resume nodes.

Each suspended portion is selectively updated by successive scans of the nodes in the suspended portion. The node scanning sequence from each of stop nodes is determined in part by the arrangement of the resume nodes in the suspended portion. In updating the suspended portion, from each stop node ascending and descending scans of its successor nodes in the suspended portion provide for accurate updating of such nodes. The scanning of the suspended portion nodes from a plurality of stop nodes is a repetition of the ascending and descending scans from the respective stop nodes connected to the one suspended portion.

The present invention enables a pattern matching network to be generalized and to have different states of memory node updating without introducing unexpected pattern matching results. Other applications of a stop node function are within the scope of the present invention.

The foregoing and other objects, features, and advantages of the invention will be apparent from the following more particular description of preferred embodiments of the invention, as illustrated in the accompanying drawing.

DETAILED DESCRIPTION

Figure 1:
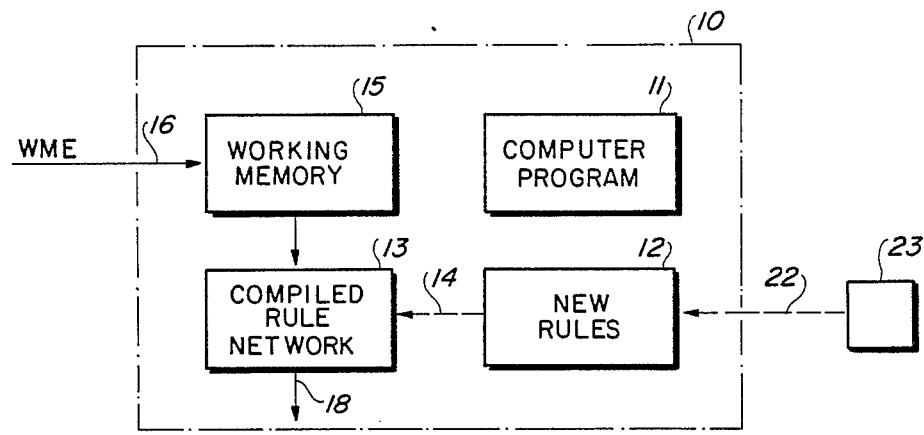
FIG. 1 is a simplified diagram of a pattern-matching system which may advantageously employ the present invention.

Referring now to the drawing, like numerals indicate like features and operations in the various figures. The present description is based upon the public knowledge of pattern matching networks as set forth in the referenced documents. A publicly known programming language that can be used to implement this description is "Common LISP"; see Guy L. Steele, Jr "COMMON LISP" Digital Press, 1984 (QA76.73.L23573 1984 ISBN 0-9 32376-41-X). A known RETE algorithm is described by Brownstone in PROGRAMMING EX- PERT SYSTEMS IN OPS5, Addison-Wesley Publishing Company pp 228–239, 1985.

The invention is practiced in a digital computer, diagrammatically shown in dashed line box 10 (hereafter computer 10). Computer program 11 is arranged as in previous matching network programs, particularly as prior RETE programs. Such programs operate on data structures (nodes, tokens, rules) to perform the pattern matching operations. A first step in generating or creating a RETE network is to specify a list of rules to define the logic paths of a network, one path per rule. A form of such a rule in shown in Schor et al., supra, on page 226. Such step results in a rule list 12 of "new rules". Then the rules are parsed and arranged, as indicated by dashed line arrow 14 into nodes with address pointers in the nodes to predecessor and successor nodes in the rule defined logic path. This parsing and arranging results in the compiled rule network 13. Each network has a root node 17 for entry by program 11. A working memory 15 (a portion of computer 10 main memory, not shown) stores WME's. When a WME is added to, deleted from or changed in working memory 15, as indicated by arrow 16, a token is created. The token is to be pushed through network 13 for updating the data or informational contents to the current state of working memory 15. Informational contents representing the informational change caused by the new, deleted or changed WME is formed into a token. That token is stored at a token address. Access to the token and its identification in network 13 is made by an address pointer to the token address. All other values and data structures are similarly identified in network 13.

Program 11 effectively passes the token representing the delta from working memory 15 to network 13 as indicted by arrow 17. Later described network data structure scanning and matching operations result in updating the network 13 and provide output data (See Forgy and Schor et al., supra) as indicated by arrow 18, by program 11 to utilization means (not shown), such as defined by Forgy, et al., or may be employed only for updating the internal data of the RETE. Because of the limitations of RETEs of the prior art, once a set of rules have been compiled, it is difficult to change any one rule, add rules or delete rules while matching existing data. The present invention obviates these problems. In fact, another computer 23, having a pattern matching system as shown for computer 10, can supply rule list changes, represented by dashed line arrow 22, to computer 10. Then the rule changes may then be compiled as set forth above into a replacement network. The replacement network may then be updated in accordance with the present invention to provide a faithful change in network functions performed via program 11 without reinitializing the entire RETE. Such faithful change means that the RETE network portion newly appended to the existing RETE and potentially sharing portions of the existing RETE having non empty result memories, is initialized as if it had been present during the original WME token pushing that created in aggregate the current existing RETE state. In particular, duplicate indications of successful pattern matches are not generated nor are true pattern matches missed in initializing the newly appended RETE portion.

Figure 2:
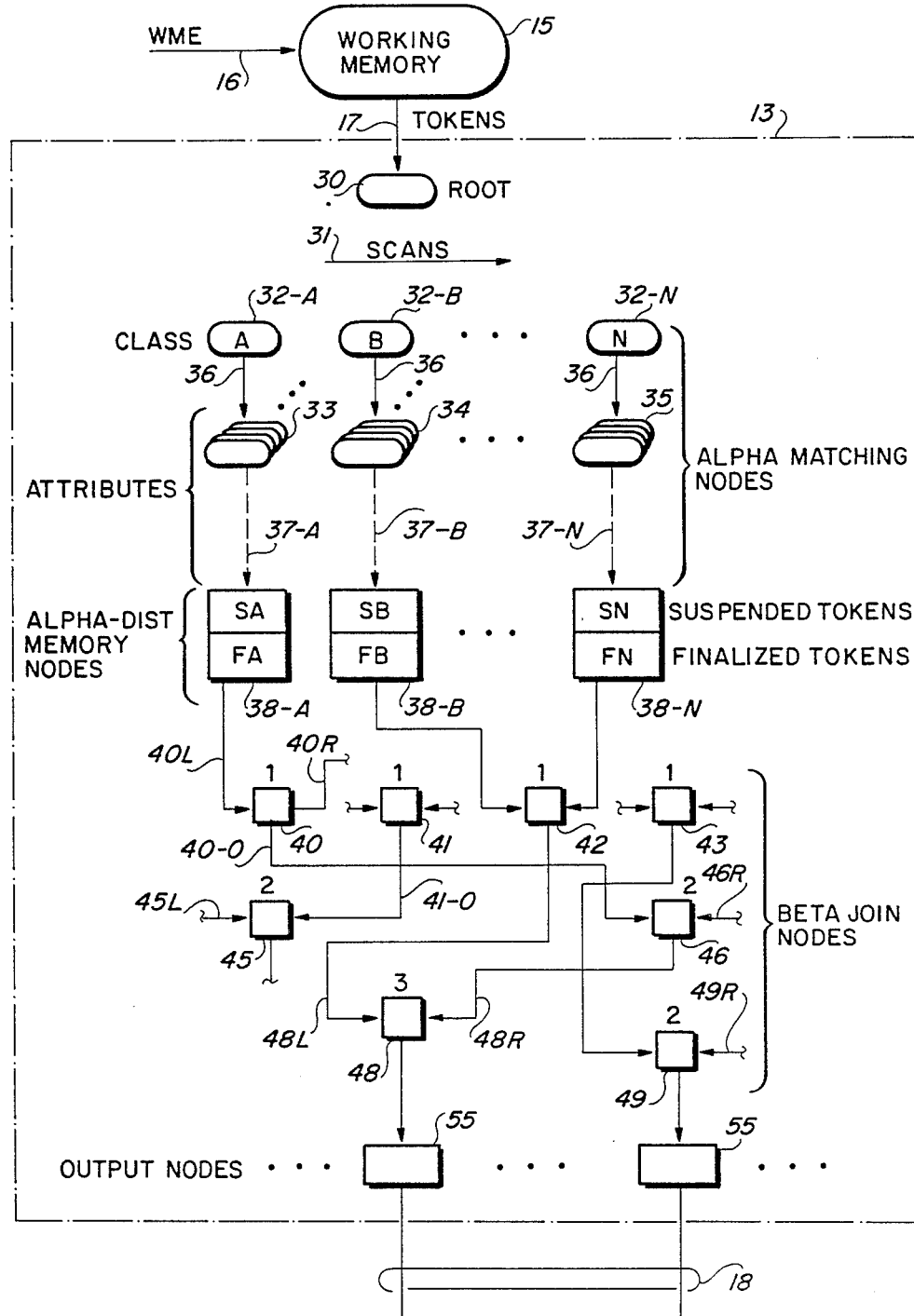
FIG. 2 is a simplified but detailed showing of a pattern matching network useable is the FIG. 1 illustrated system.

Once program 11 effectively moves a token from working memory 15 to root node 30 in FIG. 2, program 11 scans the top nodes, 32-A through 32-N, in any arbitrary or sorted order. Each node 32-x (here, 32-x denotes it is one of 32-A, 32-B, ..., 32-N) is the entry point for one or more rule defined logic paths. The attribute nodes 33–35, where each numbered node in fact denotes a multiplicity of nodes for alpha tests, in the respective logic paths are examined by program 11. For example, from a node 32-A, attribute nodes 33 are examined; similarly other attribute nodes 34 and 35 are also examined, all as diagrammatically indicated by arrows 36. The alpha portions 37-x, wherein "x" is denoted by characters A, B...N in the drawing, of the rule defined logic paths respectively terminate in the alpha distribution nodes 38-x. Note that all alpha nodes except alpha distribution nodes do not have associated result memories. For each input token satisfying an alpha path portion match requirement, the token address pointer is stored in alpha distribution nodes. For example, the alpha distribution node 38-B stores the token address of a successfully passed token through alpha path portion including nodes 32-B and 34. Suspended portions of the RETE are headed by one or more stop nodes and a set of resume nodes which are the first successor nodes to such stop nodes, as will become apparent.

A stop node can be either a beta stop node or an alpha stop node. A beta stop node has memory items while an alpha stop node has no memory items. An alpha stop node is a top node. In case there is no ambiguity, hereinafter, they are simply called as stop nodes. Stop nodes have the same data structure as other normal RETE nodes, but are program designated such that the RETE updating has "stopped" at that node for predetermined ones of the successor nodes. That is, stop nodes are introduced to enable a clear description of a partially updated RETE network. Such stop nodes may be simultaneously as a stop node preventing token propagation to predetermined successors while other successors are not subjected to the stopped updating.

The stopping means that the successor nodes of the stop node are not updated to the state of token pushing in the RETE. Designating a node as a stop node signifies that the predetermined successor nodes of this stop node have not been updated by the current token pushing operation. These predetermined successor nodes to the designated stop nodes constitute a "suspended" portion of the RETE, i.e. those nodes have not yet been updated because the RETE updating has not proceeded beyond the designated stop node. The tokens stopped at stop nodes are therefore called "suspended tokens" to signify that they have been temporarily suspended from pushing, but need more pushing into the suspended RETE whenever the RETE is to be updated in a manner to use such predetermined successor nodes. Hereinafter, the suspended tokens are simply called tokens unless there are any ambiguities.

Stop nodes may occur in practice in several ways. In one use, certain kinds of on-demand matching result in portions of a RETE network being disconnected from the main RETE network, until a particular match operation is requested. Then the disconnected portion is activated; the nodes feeding the disconnected portion are such designated "stop nodes". Another way stop nodes occur in practice is when a new set of nodes for a RETE network belonging to a new rule is merged into an existing main RETE network. This merger may result in successor nodes in the newly added RETE network being connected to existing RETE nodes having result memories; such added nodes constitute a suspended portion of the RETE. The nodes feeding the suspended portion of the RETE also are "stop nodes". In some instances, the stop node feeding the suspended portion of the RETE may be in the alpha portion of the RETE network; in this case, the top node in the alpha chain is deemed the "alpha stop node".

As another extended view of this invention, notice that the notion of the stop node is conceivably applicable to every node in a network. That is, whenever a token (WME) is pushed down from the root node, each node having a result memory, at least in concept, can be considered as a beta stop node at the instant the token arrives the node. At that very moment, the token stays at the node and the update state of all its successors, whether they are immediate or not, differs from those of predecessors, and all or a portion of its successors are to be updated later. Hence, in such a case, the portion of RETE accessible downward (toward the output RETE nodes) from this particular node can be regarded as the suspended RETE at the moment the token is residing at the node, without loss of generality; and the node which just receives the token can be similarly regarded as a stop node.

The number of stop nodes may vary; it may be one or multiple. Specifying which nodes are to be stop nodes may be predetermined in an arbitrary manner (consistent with the definition) within a network. As an example, in the case of a new RETE network being added to an existing one, the number of stop nodes is determined based on the results of merging the new RETE network with the existing one, after the new one is appended to the existing one.

In some instances the addition of nodes results in no stop nodes being designated. An example of this is the case when the added portion can be completely merged with the existing network, since there is nothing to update. When a new RETE is grafted to the existing one but there are no top nodes which are the same as the ones in the new RETE network, then the new top nodes become the alpha stop nodes, because all WMEs of those classes, if any, must be pushed from those top nodes to update all RETE portions following these alpha stop nodes.

Among nodes in the suspended portion of the RETE network, the nodes which are immediate not yet updated successors of beta stop nodes are designated "resume" nodes. This designation distinguishes such nodes from other nodes in the suspended RETE.

Given a set of predetermined stop nodes and suspended tokens stored in them, the suspended RETE portion is to be updated. This invention describes using an algorithm, how this suspended portion is updated in a correct manner.

Correct updating of the RETE network is the problem to solve. The invention achieves this by carefully ordering the various update actions, combined with special actions at beta stop node result memories. First, consider the case where there is only one stop node, in a generalized RETE network. If the stop node is an alpha stop node, standard well known RETE update algorithms give correct results, provided each beta join node encountered is treated as described next for beta stop nodes. In the alpha updating, the WMEs of the corresponding classes are pushed from alpha stop nodes through a network of nodes in the well known standard RETE implementation as is done in OPS5. The order among the successors is not significant for correctness.

A suspended portion logically descending from a single beta stop node is processed by the following steps. In a preferred implementation, suspended tokens at the beta stop node are first shadowed (later defined) in the associated result memory of the stop node, then each suspended token, one at a time is processed by first pushing it to right successors in descending order (later defined), unshadowing the token in the associated result memory, and then pushing the token to the left successors in ascending order. For purposes of correctness, the order of left/right may be interchanged; the order specified is sometimes preferred for efficiency reasons when negated joins are specified in the RETE.

Extending this approach to the case where a suspended RETE portion depends from a multiplicity of stop nodes is straightforward: merely repeat the above approach for each stop node, alpha or beta, in any arbitrary order.

The definition of descending (ascending) order of token pushing is determined by examining the relationships among resume nodes, not stop nodes themselves, and is described in detail later.

When tokens are pushed from the root node 30, stopping the token pushing at predetermined nodes having associated result memories, for example, alpha distribution nodes 38-x or beta nodes such as 40, 41, 45, 48, etc., makes such nodes beta stop nodes, and the stopped tokens suspended tokens, as those terms are used herein. In any given pattern matching operation, not all of the nodes having result memories need be designated as stop nodes; in different pattern matching operations different ones of the nodes having result memory can be designated as stop nodes. Some of the successor nodes to a designated stop nodes may be updated; those updated successor nodes are not considered to be a part of the suspended portion of the RETE. Only those successor nodes that are not updated or have not been previously updated using the suspended tokens, are considered to be the suspended portion of the RETE. It is also to be understood that any node having a result memory in the pattern matching network can be designated as a beta stop node, and the top alpha nodes can be designated as an alpha stop node.

Designating memory nodes as stop nodes is by program means. Designation of stop nodes, i.e., which nodes are to become stop nodes, may differ depending on situations and update purposes. Whenever a token arrives at a node having a result memory during normal RETE algorithm token propagation, that node can be conceptually regarded as a beta stop node, during the period from when the token came into the node and all its successors are properly updated. The two update states between the predecessors of that node and all its successors, whether they are immediate or nonimmediate, differ until node processing is complete, since the predecessor nodes have been updated by the token whereas the stop node and its successors have not. As a consequence, that portion of the network reachable as successors from the beta stop node can be thought as the suspended portion. At the same time, the token under consideration is considered a suspended token at that beta stop node.

Another instance of stop nodes occurring happens when new RETE nodes are added to an existing network, where it is desired to initialize the new nodes with existing partial match information contained in the result memories of the existing network. When an added node is logically attached (by address pointers as used in OPS5 to logically connect nodes) to a pre-existing RETE node having an associated result memory, that pre-existing RETE node is considered the beta stop node and the newly attached node (or nodes) are considered the suspended portion of the RETE.

It may happen that there is absolutely no intersection between a portion of a network being added and the existing one. A typical case is that the existing network does not have top nodes which new one has. In such a case, new top nodes, which in fact are the alpha stop nodes, are created and finally included in the new resulting network.

In both of these cases of adding new RETE nodes to a network having result memories which are not empty where it is desired that the added portions be matched with the existing partial match results currently in the result memories, the new nodes are added by storing addresses to them in the known list structure for enabling program access to the successor nodes of a RETE node. When nodes are added to a RETE, such added nodes have not been updated against existing data or WMEs. Therefore, the update state of the augmented portion of new network is different from that of pre-existing portion of the new one. In order to eliminate such an inconsistent update within a network, the newly added portion, which is the suspended portion of RETE, should be updated to achieve consistent RETE state. In updating the suspended portion, it may also be desired not to completely update all portions of the pattern matching network; in that case the nodes having result memory which are the immediate predecessor nodes to the portion not to be updated are beta stop nodes and the portion not to be updated becomes the suspended portion. Other situations and operational programmed effected procedures may be used as well in designating stop nodes and identifying a resultant suspended portion of nodes that are not currently updated to the updating state of the remaining nodes of the network.

The action of sending tokens up to a set of beta stop nodes, or creating new alpha stop nodes (top nodes) from which WMEs are to be sent, completes an "initial step" on network 13 updating to provide RETE states which need further update operations down to the bottom nodes of RETEs. It should be kept in mind at this stage of token pushing that the RETE algorithm has updated memory nodes only up to beta stop nodes; none of the successor nodes of the alpha and beta stop nodes in the RETE have been updated. A case of the situation described above, among many, can be seen when a rule is added to the existing rule set. For example, if a new output (bottom) node 55 with a predecessor node 49 is added to the join node 43 as an LHS input, then the join node 43 becomes a designated beta stop node upon such addition. The successor nodes of the join node 43, which are not in the same update state as pre-existing RETE network (so a delta exists between these successor nodes and the state of the working memory), constitute a suspended portion of the RETE network. That is, all nodes in the RETE except the nodes in the suspended portion(s) have already been updated. Also note that neither nodes 49 nor added output node 55 are updated when attached; hence it is necessary to designate join node 43 as a beta stop node. This logical distinction of the suspended portion is achieved by standard programming techniques, for example, having a list with pointers to designated stop node and its suspended portion identifying the two nodes for updating in accordance with the present invention. The creation and structure of such a list per se, is well known; the content for pointing to the designated stop node and its immediate successor merely adds informational content to the known structure.

Updating the nodes in the suspended portion of RETE is achieved through the beta updating and alpha updating. The beta updating, based on a set of beta stop nodes, is conducted by using the complementary token pushing steps (initial step and second step) of the present invention for enabling generalizing the pattern matching network structure and operations while obtaining correct pattern matching results. Alpha updating consists of pushing the tokens associated with a particular top node through the RETE starting at the particular top node, in the standard manner as is well known in present RETE as practiced in OPS5, or equivalent, provided that each beta join node encountered is processed with the algorithm described in this invention for beta stop node updating. The order of processing for the case where more than one stop node is involved does not matter, for purposes of correctness of the result.

Before describing the token pushing of the present invention from the designated stop nodes, the beta node array is described. The beta nodes include join nodes described above. Join nodes enable pattern matching machine implemented operations using predicate tests of the respective join nodes. Each join node has both LHS and RHS inputs. In contrast to the prior art wherein the RHS input never was the output of a predecessor join node, in generalized pattern matching networks enabled by the present invention, any join node can have RHS or LHS inputs fed from predecessor join nodes. Program 11 scans the beta join nodes as indicated by the arrows extending between the nodes 40–49.

To describe the proper ordering of sending down from a beta stop node, it is necessary to specify precisely the notion of descending and ascending order of the resume nodes. This is done as follows: Resume nodes for a particular stop node may be partitioned into disjoint subsets, where two resume nodes belong to a subset if and only if one is reachable from the other. A node is called "downwardly reachable" from another node, if the former is one of immediate or non-immediate successors of the latter. Similarly, a node is called "upwardly reachable" from another node, if the former is one of immediate or non-immediate predecessors of the latter. Two resume nodes are reachable from each other if one is downwardly reachable from the other (and of course, vice versa).

For each resume node subset having more than one resume node, the nodes may be ordered according to upward and downward reachability. The descending order of selecting resume nodes means selecting resume nodes such that a resume node is not selected for updating until all of its upwardly reachable resume nodes in its subset have been selected. Likewise, the ascending order of selecting resume nodes means selecting them such that a resume node is not selected until all of its downwardly reachable resume nodes have been previously selected for updating.

Each join node has two input ports, named the LHS input and the RHS input, and one output port. In the generalized pattern matching network, the LHS input port may be connected to the output port of a predecessor join node. When a token is passed from a predecessor node to a next successor node (as from node 40 to node 46), the token address is usually stored in the output of the passing predecessor node (enables sharing by plural successor nodes) in the output node's associated result memory. Each result memory may store a plurality of such token addresses—representing a plurality of partially (meaning up to that point) matched tokens. A LHS input port for the join nodes is represented by L following the node number, that is, 40L identifies the left hand sided input port of node 40. Similarly, R following a node number indicates the right hand sided input port, 40R identifies the right hand sided input port node 40. The output port is identified by "-0" following the node number, that is, 40-0 indicates the output port of node 40. In usual updating operations, the output tokens of a node travel to all logically connected successor nodes. Recall that a predecessor node is one that is closer to the root node than the node of interest, i.e. node 40 is a predecessor node to node 46. It is to be appreciated that in a constructed embodiment, that the number of join nodes may be numbered in the hundreds or more; the illustration of FIG. 2 is for demonstrative purposes only to enable an understanding of the present invention.

It is to be understood that the token pushing cascades toward the output nodes 55 through the node hierarchy. If a join node had memory items from RHS input, then upon receiving a token at its LHS input, then the output of the this node (which has joined the LHS and RHS token inputs) is a join change token, if the join operation is successful. Such join tokens are propagated to all immediate successor nodes, both left and right successors.

Whenever a join node has a change token at one input and a result memory at the opposite input, program 11 conducts all necessary tests as determined by the particular join nodes predicates between the LHS and RHS inputs. The join nodes operate in the well known manner of the OPS5 RETE algorithm, sending successful join results downward to subsequent RETE nodes, or finally, out the bottom of the RETE 18.

It should be also appreciated that like the prior RETE networks, the current invention uses storage of partial matching results at the various nodes throughout the network. Accordingly, once the network is updated, the partial results remain distributed in the result memories associated with various nodes throughout the network.

The suspended part of RETE network can be updated in accordance with the present invention. Suspended tokens that have reached the beta stop nodes but which have not yet been pushed to successor nodes can update the suspended portion of RETE in the beta updating phase, which in turn consists of four successive program steps. A corresponding alpha updating phase sends tokens from WME top nodes. The top nodes contain an ability to access all WMEs matching the top node, by standard programming techniques, such as keeping a list of WMEs matching the top nodes associated with each top node.

When more than one stop node exists, the above algorithm is repeated for each stop node, individually, where the stop nodes may be processed in any order. Each stop node, once selected, can be completely processed before continuing to the next stop node, or alternatively, suspended tokens may be processed from various stop nodes, in arbitrary order.

Figure 3:
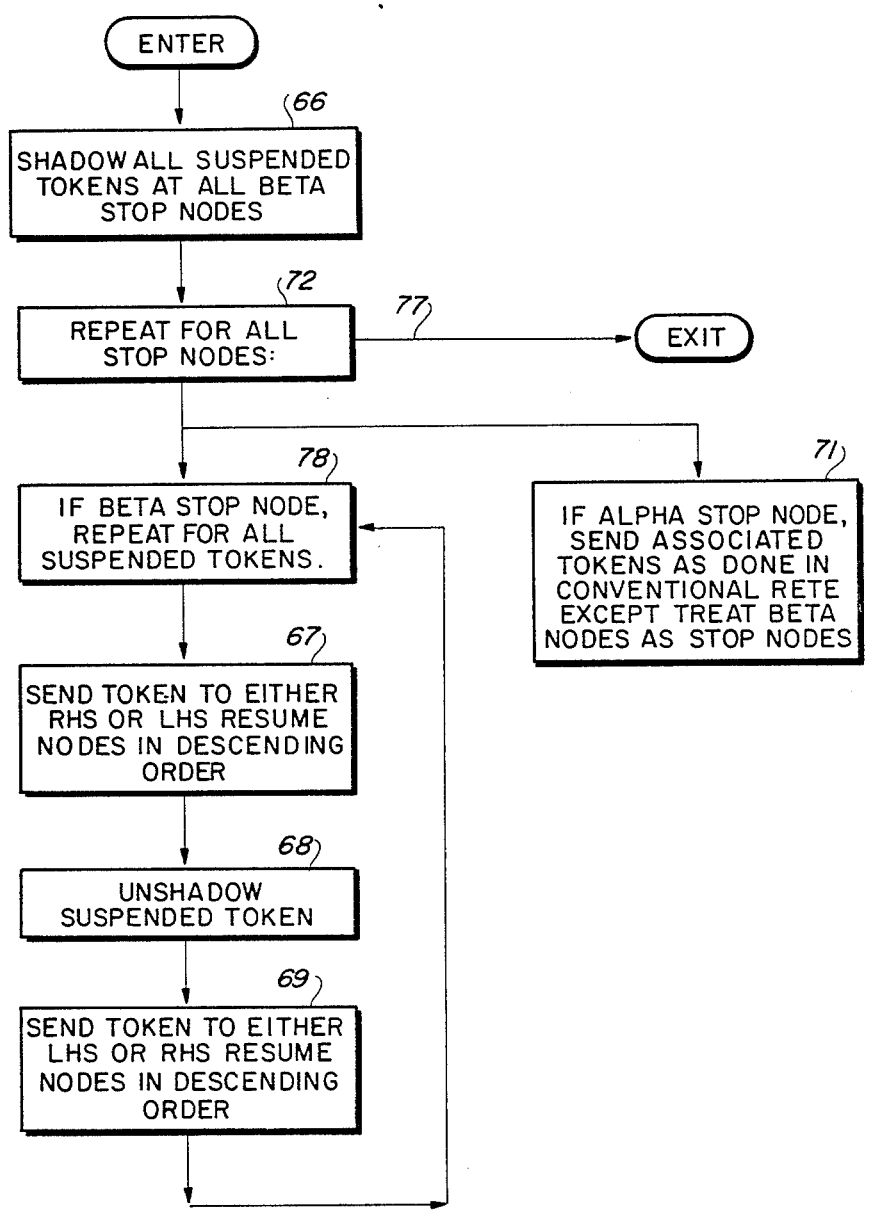
FIG. 3 is a simplified flow chart illustrating the updating process employed in the FIG. 1 illustrated system.

FIG. 3 illustrates a modification to the known RETE algorithm, for example, for practicing the present invention therewith. The FIG. 3 flow chart shows beginning the network updating operations upon completion of the matching operations up to a currently designated stop node of pattern matching network 13. All such matching operations can be used in the prior art.

For generality, it is assumed that the currently designated beta stop nodes have both finalized and suspended memory items. Here, a finalized memory item is one which has been pushed down to successors of the stop node and has correctly updated successor RETE nodes.

In the first or initial one of the complementary updating steps, all the suspended memory portions of all beta stop nodes have respectively received token addresses representative of a successful logic matching operation in the predecessor nodes to the respective stop nodes. At machine-executed step 66, program 11 "shadows" all of the suspended tokens that have arrived at all beta stop nodes. Shadowing means that the associated result memory for the stop node is put in the state it would be before the stop node processed the suspended token. For adding of new tokens, for example, this means the token is logically not present in the result memory; for removing existing tokens, this means the token, if present in the result memory, is not yet removed. This action is effected by conventional programming means, such as delaying the updating of the result memory for suspended tokens.

Once the first or initial step is completed for all beta stop nodes, the nodes are processed through the program steps 67 through 72, taking each stop node, in any arbitrary order as indicated at step 72. Step 72 represents looping program action as described herein. Such program looping or iterating is well known and not detailed for that reason. If at step 72, the stop node being processed is an alpha node, then at step 71 normal or prior art RETE updating algorithms are used, except that the beta nodes are updated as if each one reached is itself a stop node, in a recursive manner. If at step 72 the stop node is a beta node, in the next machine-executed step 70, the following sequence of steps is repeated, once for each suspended token, with the sequence of the three steps 67, 68 and 69 being completed once for each suspended token before the next suspended token is processed. From either step 71 or upon completing the program loop 70, 67, 68 69, program step 72 is re-executed looking for another stop node to be processed as above described. If none are found, then the FIG. 3 illustrated set of machine steps is exited as indicated by arrow 77. In the second machine-executed program step 67 (the initial updating step), a suspended token in a beta stop node is pushed to resume node RHS inputs. The pushing is performed in an order among the various resume nodes connected to the beta stop node by the level of the resume nodes in a descending order, as determined among subsets of resume nodes as described above. Disjoint subsets of resume nodes are independent and may be processed in arbitrary order; however, within each subset, the descending order must be first used. Subsets are guaranteed to be disjoint.

In the machine-executed step 68, the shadowing is removed; i.e., the update implied by the shadowed token is done to the associated result memory of the beta stop node. This may add, remove, or modify a token in the result memory. The illustrated machine executed step 69 pushes the just restored token in an ascending scan of the resume nodes in the suspended portion of the pattern matching network. This step is the second updating step of the two complementary updating steps. Here, ascending order is determined as described above, in terms of upward or downward reachability among disjoint subsets of mutually-reachable resume nodes. Upon completion of step 69, the suspended token becomes finalized, permanently stored in the suspended portion of the RETE. The above three steps 67, 68, and 69, are repeated for all suspended tokens in all beta stop nodes in any order.

When a beta stop node has no more suspended tokens, the stop node designation for the respective memory node may be removed, i.e. the update operation is complete. The stop node designation may be retained to prevent further updating. Either option is a selection based on criteria and desires beyond the present description.

In the above detailed description, due to the symmetry of join nodes, the RHS and LHS designations may be interchanged in any of the join nodes without affecting the correctness of the outcome. This completes the updating operation for a generalized RETE with stop nodes. Program 11 now resumes program execution as provided in the prior art systems.

Figure 4:
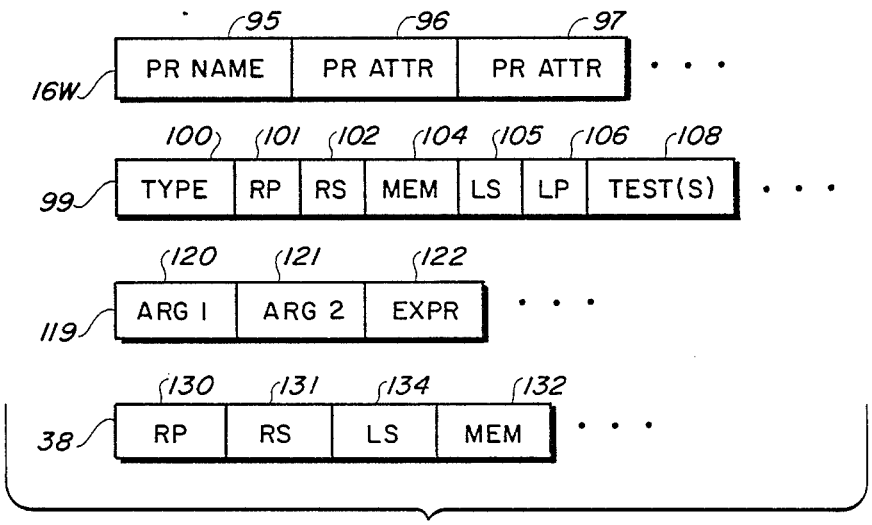
FIG. 4 is a simplified showing of data structures useable in the FIG. 1 illustrated system for achieving an understanding of the present invention.

The data structure arrangements useful in implementing the present invention in a network 13 and program 11 are shown in simplified form in FIG. 4. The illustrated data structures are but a small portion of data structures used in the prior art pattern matching networks; the illustrated structures are those for illustrating the present invention. A WME 16W includes a memory address pointer PR NAME 95 to the class name as may also be used in class nodes 32. Also included are memory address pointers PR ATTR 96, 97 et seq (ellipsis) pointing to data used in the tests of the join nodes. Other fields may also be found the each WME, such fields not important to reach an understanding of the present invention.

A beta join node data structure 99 includes field TYPE 100 which indicates the character or type of join node. Included in this field is an indication of that portion of program 11 to execute, viz a module such as for an AND node, etc. Field RP 101 contains a memory address pointer to the right predecessor node, if any. Field RS 102 contains a memory address pointer to any data structures which describe the set of right successor nodes (if any exist). Field MEM 104 stores a pointer to the node result memory used, for example, to store partial results. Field LS 105 stores a memory address pointer to any data structures which describe the sequence (e.g., list) of left successor nodes, if any. Field LP 107 stores a memory address pointer to the left predecessor node, if any. TEST(S) 108 contains memory address pointers to the table or linked list of tests to be conducted by program 11 upon scanning the node. Other fields may be employed in establishing a structure for the beta nodes. The location of the fields within all of the illustrated data structures indicate the function of the stored information.

Definition 119, of the beta node tests (beta tests) which are a part of each beta join node, includes fields ARG1 120 and ARG2 121 which contain information enabling the determination of the input arguments from the input tokens for the join node for the tests to be conducted on the arguments by program 11. Field EXPR 122 stores a memory address pointer to an expression representing the predicate test which may be associated with the beta node tests. ARG1 or ARG2 respectively are the first and second input to the predicate test, respectively.

An alpha distribution node data structure 38 includes fields RP 130, which is a memory address pointer to the predecessor node, fields RS 131 and LS 134 which are similar in function and meaning to beta join node fields RS 102 and LS 105, and field MEM 132 which is similar in meaning and function to beta join node field MEM 104.

The utilization of the described data structures for a pattern matching system of FIG. 1 follows usual programming techniques, such as contemplated for Common LISP and other languages. Various approaches to system design may be employed for implementing the present invention, no limitation to the preferred RETE network is to be implied by the present description. The updating provided by the present invention handles several variations of problems and situations. A memory node which is a designated stop node may have multiple RHS and LHS successors to be updated and arranged in an arbitrary logical sequence. A single designated stop node may have both a plurality of immediate right and left successor nodes in a suspended RETE portion.

Each stop node may have multiple immediate successor nodes each of which are nodes in a plurality of suspended portions of the RETE. The updating scans follow the rules set forth above.

A new output node may be added with a plurality of predecessor nodes intervening between the stop nodes and the new output node. In this instance the updating procedure set forth above can be used to successfully update the suspended RETE portion, finally resulting in a correct updating of the state of the new output node. Other variations and situations in a pattern matching network result in successful updating of the network by employing the present invention.

While the invention has been particularly shown and described with reference to preferred embodiments thereof, it will be understood by those skilled in the art that various changes in form and details may be made therein without departing from the spirit and scope of the invention.

What we claim is:

1. In a machine-effected method of updating a pattern-matching network having a plurality of logically interconnected join nodes, each said join node including two inputs, a left-hand sided (LHS) and a right-hand sided (RHS) input, and an output, predicate means in each node for enabling comparison of change tokens supplied to one of the inputs with data supplied to a second one of the inputs and for generating output logic results of the comparison in accordance with logic of the predicate means, said join nodes forming an array having hierarchical levels extending from an input side to an output side of the pattern matching network, from said input side to said output side being in a descending order of levels and from said output side to said input side being in an ascending order of levels;

the machine-executed steps of:
providing a plurality of change tokens and match data at the input side, first predetermined ones of said change tokens being directed to RHS inputs and second predetermined ones of said match data being directed to LHS inputs of predetermined ones of said join nodes at diverse ones of said hierarchical levels;
first supplying first ones of said change tokens to given ones of said join nodes in a descending order; and
second supplying second ones of said change tokens to said given ones of said join nodes in an ascending order whereby the given join nodes are updated without error.

2. In the machine-effected method set forth in claim 1 wherein a plurality of memory nodes are disposed in a logical change token-receiving relationship to said input side and said of said memory nodes being capable of storing change tokens;
   further including the machine executed step of supplying said stored change tokens to inputs of said given ones of said join nodes.

3. In the machine-effected method set forth in claim 1, further including the machine-executed steps of:
   establishing a root node to receive a change token to be processed;
   between said input side and said root node establishing a plurality of logic paths each of which include pattern matching means and respectively terminating said paths in a plurality of memory nodes adjacent said input side;
   logically connecting each of said memory nodes to one input of said join nodes, respectively, in diverse ones of said levels;
   pushing a change token through said root node and said logic paths to one or more of said memory nodes; and
   then executing the machine-executed steps set forth in claim 1.

4. In the machine-effected method set forth in claim 3, further including the machine-executed steps of:
   establishing a plurality of pattern-matching rules;
   during pattern-matching operations, changing one of said rules and a logic path associated with said one of said rules, then updating the memory nodes by pushing tokens through said root node and said given ones of said join nodes; and then performing the machine-executed steps set forth in claim 1.

5. In the machine-effected method set forth in claim 1, further including the machine-executed steps of:
   designating said first ones of said change tokens as RHS inputs and second ones of said change tokens as LHS inputs;
   in said first supplying step, supplying said RHS inputs only to RHS successor ones of the given ones of said join nodes;
   in said second supplying step, supplying said LHS only to said LHS successor ones of the given ones of said join nodes; and
   at each of said LHS successor ones of the given ones of said join nodes, determining if the RHS input has received an input during said first supplying step, if an RHS input was received, then joining the LHS and RHS inputs at the respective join node and then supplying a join change input to all immediate successor nodes at either the LHS or RHS inputs of such immediate successor nodes.

6. In the machine-effected method set forth in claim 1 further including the machine-executed step of:
   supplying either said left and right ones of said inputs to either of said RHS or LHS inputs.

7. In a machine-effected method of communicating a pattern-matching network between first and second pattern matching systems, each of the systems including a working memory having tokens which have been processed in the respective system, in each of said systems, a plurality of pattern match nodes being interposed between the working memory and a plurality of stop memory nodes, a plurality of join nodes in at least one suspended portion of the network for receiving tokens from the stop memory nodes and supplying tokens to network output memory nodes, updating said suspended portion using predetermined ones of said tokens processed in the network, said predetermined ones being fewer than all of the tokens processed in the network, a set of pattern-matching rules, one for each network output memory node, defining a single logic path from the working memory to respective ones of the network output memory nodes, each join node having an output and a right hand sided (RHS) and a left hand sided (LHS) input;
the machine-executed steps of:
   updating the pattern matching network up to a set of stop memory nodes by pushing all current tokens through the array of match nodes and updating the stop memory nodes;
   pushing tokens from first ones of said stop memory nodes only to one input of each of predetermined ones of said greater plurality of join nodes which are connected to said first ones of said stop memory nodes including updating all successsors of said predetermined ones of said greater plurality of join nodes; and
   pushing tokens from said first ones of said stop memory nodes only to a second input other than said one input of said predetermined ones of said greater plurality of join nodes including updating all join nodes which are successor nodes to said predetermined join nodes.

8. In the machine-effected method set forth in claim 7, further including the machine-executed steps of:
   in each of said scanning steps, pushing said tokens from the immediate successor nodes of the designated stop nodes in a sequence determined by the type of input of each succeeding one of the successor nodes and the updated status of each said successor nodes to said immediate successor nodes of the designated stop nodes.

9. In the machine-effected method set forth in claim 8, further including the machine-executed steps of:
   designating nodes as right or left successor nodes:
   in said descending scan, pushing said tokens only to right successor nodes; and
   in said ascending scan, pushing said token only to left successor nodes excepting performing a join operation at each left successor node whenever such left successor node has received a token as a right successor node, then generating a join change token and pushing that join change token to all immediate successors whether left or right successors.

10. In a machine-effected method of operating a pattern matching network, including the machine-executed steps of:
   defining an input side of the pattern matching network and an output side of the pattern matching network;
   defining a plurality of multiple input pattern matching nodes to have predetermined tests to be conducted and each capable of having said LHS and RHS inputs and an output to one or more successor nodes, defining ones of said pattern matching nodes as memory nodes;
   defining a plurality of single input pattern matching nodes having a single RHS input and a single output and having predicate tests for defining the logic for passing a token received at the single RHS input if the token meets predetermined criteria, else not passing the token;

defining logical connections between said nodes and said sides for defining logical pattern matching paths from the input to the output side;

designating predetermined ones of said memory nodes as stop nodes; and updating the pattern matching network to all nodes including to said stop nodes and not updating predetermined ones of the successor nodes of said stop nodes to create a suspended portion of the pattern matching network which has an updated status different from nodes not included in said suspended portion.

11. In the machine-effected method set forth in claim 10, further including the machine-executed steps of:

updating the nodes in the suspended portion in two successive complementary updating steps of first updating the nodes in the suspended portion having RHS inputs in a descending scan beginning with the immediate successor nodes having the fewest nodes intermediate the immediate successor nodes and the stop nodes and second updating the nodes having LHS inputs in an ascending scan of the suspended portion nodes wherein ascending scan is a scan of the stop nodes beginning with the stop node having an immediate successor node having a largest number of nodes between itself and the respective stop nodes of the pattern matching network; and successively scanning from said stop nodes first to a successor node of the respective stop nodes having fewest nodes intermediate itself and the respective stop nodes then to other successor nodes of the respective stop nodes having an increasing number of nodes intermediate the respective stop nodes and the other successor nodes and second scanning the successor nodes beginning with a successor node to the respective stop nodes having a largest number of the nodes intermediate itself and the respective stop node and proceeding to successor nodes having fewer and fewer nodes intermediate such proceeded to successor nodes and the respective stop nodes.

12. In the machine-effected method set forth in claim 11, further including the machine-executed steps of:

scanning successor nodes of said immediate successor nodes in a sequence consisting of nodes having an RHS input which received a token, nodes having an LHS input which received a token, and first predetermined ones of said nodes having both RHS and LHS inputs which received a token, in the first ones of said nodes, creating respective join change tokens and scanning all immediate successor nodes of said predetermined ones of said nodes using said join change tokens, respectively.

13. In the machine-effected method set forth in claim 10, further including the machine-effected step of:

in said defining logical connections steps, defining the inputs to said RHS and LHS inputs as being from any possible input whether a left sided input or a right sided input.

14. In a machine-effected method of processing change tokens through a pattern-matching network, including the machine-executed steps of:

establishing a plurality of stop nodes in the network and identifying successor nodes to each of the stop nodes, respectively;

processing change tokens through the network including suspended ones of the change tokens to said stop nodes and identifying predetermined ones of said successor nodes as resume nodes for predetermined ones of the stop nodes, respectively, and maintaining the suspended change tokens in an inaccessible state so that each of the suspended change tokens is not processed to successor nodes of the respective stop nodes even though change tokens are processed through other portions of the pattern-matching network; and for each of the stop nodes, identifying resume nodes for each of the stop nodes, respectively, each of said resume nodes being a first node to receive a suspended change token from the respective stop nodes when the suspended change token is processed from the respective stop node; processing in a predetermined order predetermined ones of the suspended ones of the change tokens at the respective stop nodes in a descending order of resume nodes, after processing each of the tokens in a descending order, removing the inaccessible state from a suspended change token and then processing the suspended change token in an ascending order of said resume nodes, all processing proceeding through the respective resume nodes to its successor ones of the nodes.

15. In a machine-effected method of operating a pattern matching network, including the machine-executed steps of:

establishing multiple input pattern matching nodes each of which have a memory for storing partial pattern matching results;

logically connecting the multiple input pattern matching nodes such that the memory of one of the nodes is a right hand sided (RHS) input to another of the nodes and a third one of said nodes supplies another input to said another node includes left hand sided (LHS) data for comparison with the RHS input; and for any given token being pushed through the network, making successor nodes to any predecessor node of either said LHS or RHS inputs receive either a change token or LHS data without any restriction on succession of LHS and RHS inputs such that an LHS input node may output to an RHS input node and an RHS input node may output to an LHS input node.

16. In a machine-effected method of updating a pattern-matching network having a plurality of pattern matching nodes, including output nodes, which are logically interconnected for effecting pattern matching operations including updating the pattern matching network with new, changed or deleted information; including the machine-executed steps of:

dividing the network into first and second groups of nodes such that the second group of nodes does not supply pattern matching information to the first group of nodes but that the first group of nodes supplies pattern matching information to the second group of nodes;

updating the first group of nodes without updating the second group of nodes; and updating the second group of nodes by changing the nodal information in two successive node scanning steps, in each step scanning predetermined ones of the nodes in the second group, in the first step scanning the nodes in a descending direction (toward the output nodes of the network) and in the second step scanning the nodes in an ascending direction (away from the output nodes of the network).

17. In the machine-effected method set forth in claim 16, further including the machine-executed steps of: making each node of the first group which supplies pattern matching information directly to the second group a stop memory node for storing pattern matching results.

18. In the machine-effected method set forth in claim 17, further including the machine-executed steps of:
in each of the two scans in the second groups, determining the sequence of scanning of the nodes directly connected to stop ones of the nodes in accordance with the logical relationship of each of the resume ones of the nodes to said stop memory nodes and updating the successors to said stop ones of the odes in a descending scan of the successor nodes of said stop ones of said nodes, respectively.

19. In the machine-effected method set forth in claim 18, further including the machine-executed steps of:
making a first one of said second group scans a descending scan of the resume ones of the nodes (scanning a first predetermined one of the resume ones of the nodes first and scanning nodes to a second predetermined one of the resume ones of the nodes to the respective stop memory nodes) and making a second one of said second group scans an ascending scan of said predetermined ones of the resume ones nodes.

* * * * *